April 19, 1927.  
E. HOPKINSON ET AL  
1,625,122  
PROCESS OF MANUFACTURING TIRE CASINGS FOR MOTOR VEHICLES  
Filed Nov. 15, 1922  3 Sheets-Sheet 1
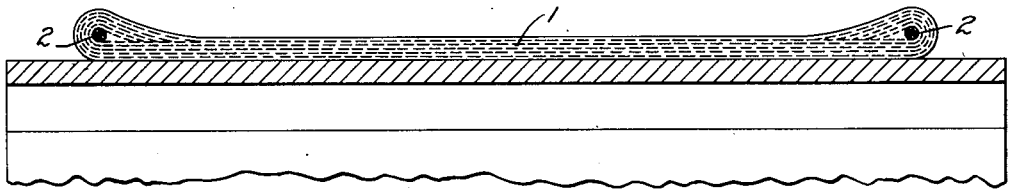
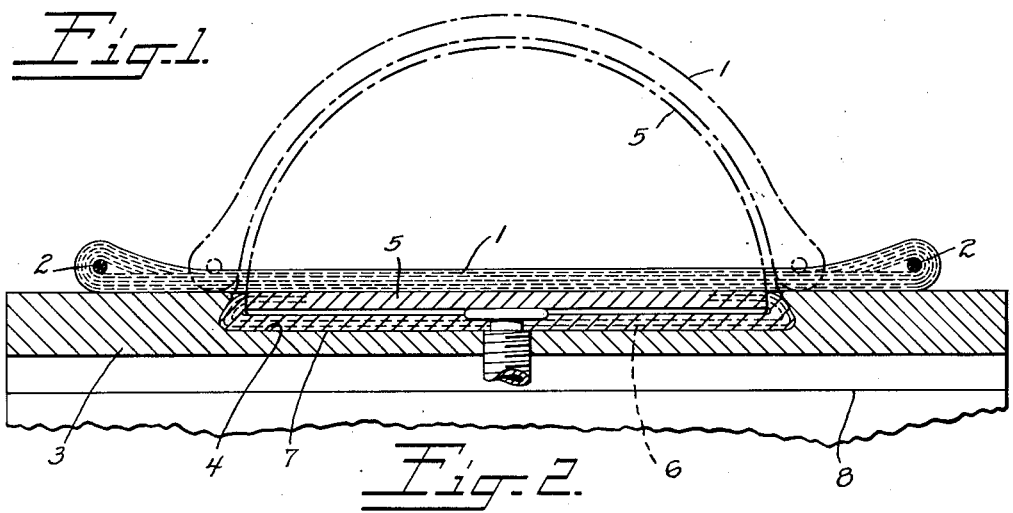
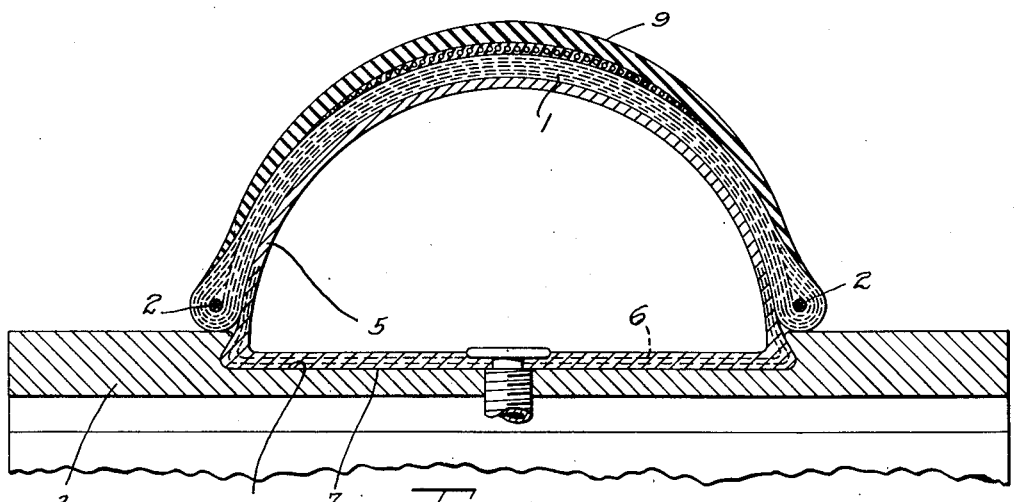
Inventors,  
Ernest Hopkinson and  
William J. Steinle, April 19, 1927.

E. HOPKINSON ET AL 1,625,122

PROCESS OF MANUFACTURING TIRE CASINGS FOR MOTOR VEHICLES

Filed Nov. 15, 1922  3 Sheets-Sheet 3

Inventors,
Ernest Hopkinson and
William J. Steinle,
Attorney.

Patented Apr. 19, 1927.

1,625,122

UNITED STATES PATENT OFFICE.

ERNEST HOPKINSON, OF NEW YORK, AND WILLIAM J. STEINLE, OF FLUSHING, NEW YORK; SAID STEINLE ASSIGNOR TO THE HARTFORD RUBBER WORKS COMPANY, OF HARTFORD, CONNECTICUT, A CORPORATION OF CONNECTICUT.

PROCESS OF MANUFACTURING TIRE CASINGS FOR MOTOR VEHICLES.

Application filed November 15, 1922. Serial No. 601,009.

This invention relates to the manufacture of tire casings for motor vehicles and more particularly, to a new and improved method of shaping them to tire form from a substantially flat band.

Various methods have been proposed from time to time for transforming to tire shape laminations of rubberized cords and vulcanizable rubber composition which have been previously assembled in "pulley-band" form. This invention aims to provide a new and improved procedure somewhat simpler and less expensive than prior practices for the manufacture of certain kinds of casings.
With the illustrated embodiment in mind and without intention to limit more than is required by the prior art, the invention concisely summarized consists in partly shaping a flat carcass, applying a tread of vulcanizable rubber composition to the partly shaped carcass to hold it approximately semi-circular (thereby facilitating the introduction of an expansible core or sealing ring), subsequently, completely forming the treaded carcass to tire shape and assembling it on an annular bag or sealing ring, and finally, vulcanizing the casing while subjecting its interior to fluid pressure applied either directly through its inner surface, as when a sealing ring is used, or indirectly, as when an inflatable rubber core or bag is employed.

A preferred embodiment of the invention is illustrated in the accompanying drawings in which:—
Fig. 1 represents a carcass as built flat on a drum;

Fig. 2 represents the carcass transferred to a shaping machine having an inflatable tube for partly shaping the carcass;
Fig. 3 shows the partly shaped carcass to which has been applied a tread of vulcanizable rubber composition to hold it in shape;

Figure 4:
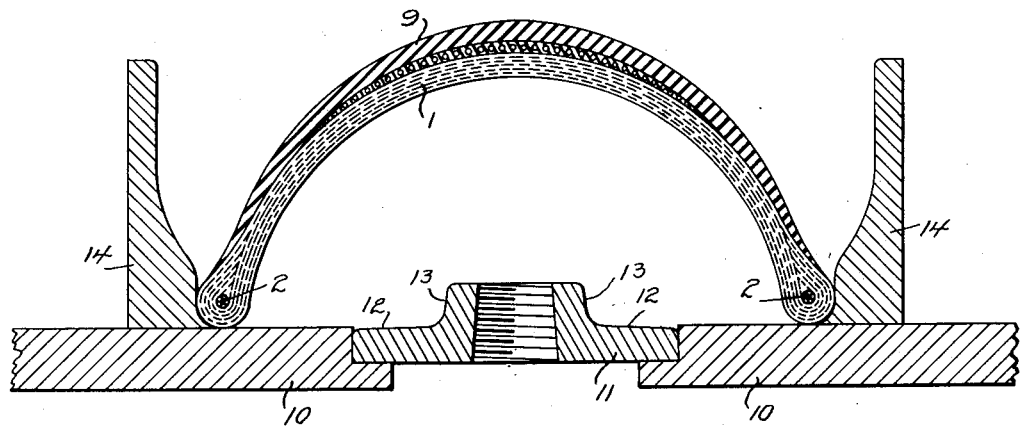
Fig. 4 illustrates final shaping and mounting apparatus, one form of an annular support (a sealing ring) being illustrated in the position it occupies at the outset of the final shaping operation.

In the drawings, the invention is illustrated as practiced in the manufacture of straight-side casings, i. e., those having inextensible bead members or wires incorporated in their margins. It is to be understood, however, that clincher casings, with extensible bead members, may be manufactured according to the present invention by suitably modifying the directions to be hereinafter given in a manner that will be obvious to those skilled in the art.

According to our invention, we first build a carcass 1 of any suitable character of strain-resisting-elements, such as plies of rubberized cords, in the flat form illustrated in Fig. 1 on a collapsible drum. Convenient apparatus and sufficient directions for doing this are given in prior patents, such as No. 1,310,701, granted July 22nd, 1919, and No. 1,374,505, granted April 12th, 1921. Bead members 2 of the inextensible type illustrated, or of an extensible type (not shown) may be incorporated in the margins of the band. The completed and substantially flat band is then transferred to another drum 3, preferably collapsible, which is grooved, as indicated at 4, to receive an inflatable tube 5. This is desirably reinforced, as indicated at 6, with bias cut fabric, for instance, permitting the inner wall of the tube to stretch longitudinally to a limited extent without breaking away from the surface 7 of the drum to which the tube 5 may have been cemented, or otherwise secured, previously. The bias fabric 6 stiffens the inner wall of the tube somewhat, but permits limited longitudinal stretch, and hence, making the support or drum 3 with collapsible sections, as indicated at 8, if desired, to facilitate manipulation of the casing.

After the flat carcass is adjusted on the drum 3, as illustrated in Fig. 2 in solid lines, it is partly formed to tire shape, preferably nearly semi-circular, as indicated in dotted lines, by inflating the inner tube 5.

To the partly shaped and approximately semi-circular carcass, a strip of tread stock 9 of vulcanizable rubber composition of suitable thickness is then applied and rolled down in position so as to both adhere it to the carcass and condense its skirts, thereby maintaining a grip on the fabric carcass tending to hold it more or less to the form in which it is shaped by the inflatable tube 5. The inflatable tube 5 is next collapsed and the partly shaped band removed from the drum 3.

Figure 5:
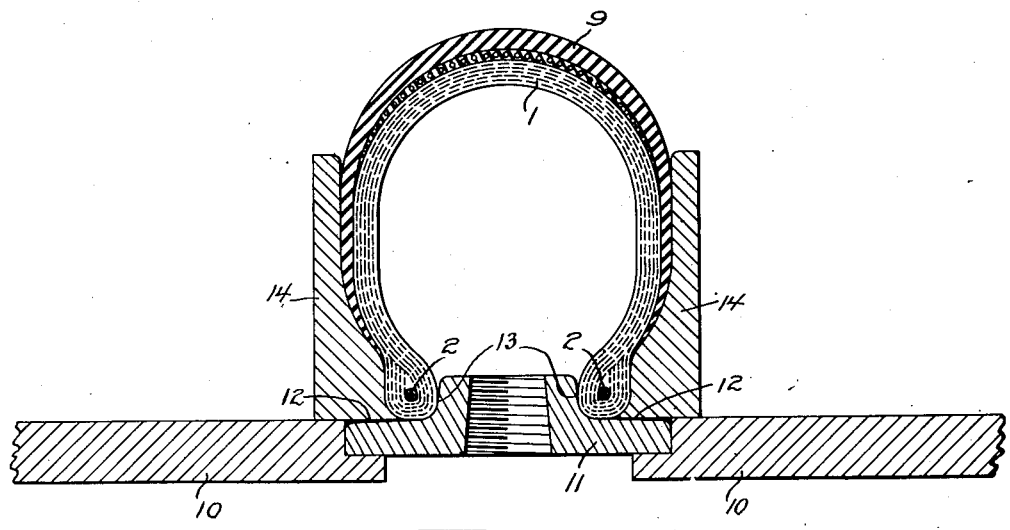
Fig. 5 illustrates the casing and parts in the position they occupy at the completion of the operation in the final shaping machine.

We, preferably, complete the shaping of the band upon the cylindrical support 10. This may be of any suitable form and construction, preferably collapsible, adapted to receive an annular support, such as the sealing-ring shown at 11, which, preferably, has seating faces 12 and abutment faces 13 for predetermining the position, or spacing apart, of the margins of the casing. The margins of the casing are then pushed upon by any suitable means, such as annular rings 14, shaped approximately as illustrated, and thereby the casing is substantially completely shaped and its margins simultaneously seated on the annular support. In Fig. 5, the casing and parts of the apparatus are shown in the position they occupy at the completion of the operation.

By substantially completely shaped, we do not refer to the dimensions of the casing in cross-section, rather we refer to its general outline. At this time, the diameter of the casing at its tread, for instance, may be approximately equal to its diameter when completely vulcanized, but in most cases, depending upon the number of plies of fabric, the angle of the cords, or strain-resisting-elements, in the respective plies, and the nature of the cords and the bead member, the diameter of the casing at the tread will be somewhat less than when it is finally vulcanized. A limited amount of stretch, or distension, occurs when a fluid under pressure is supplied to the interior of the casing, or a hollow water-bag within the casing, either of these ways of applying an internal fluid pressure during vulcanization being available.

Figure 6:
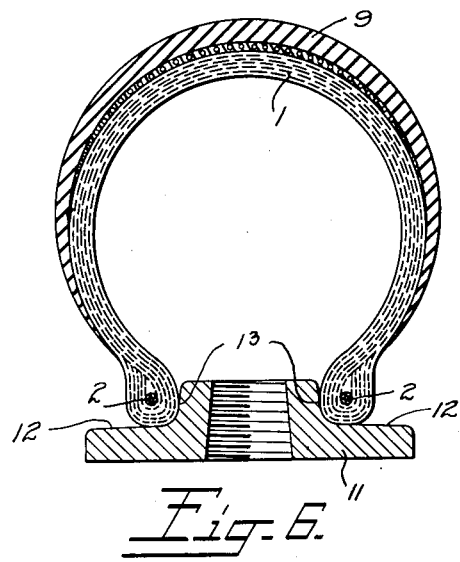
Fig. 6 shows the tire in cross-section mounted on a sealing-ring and ready for introduction in a vulcanizing mold.
Figure 7:
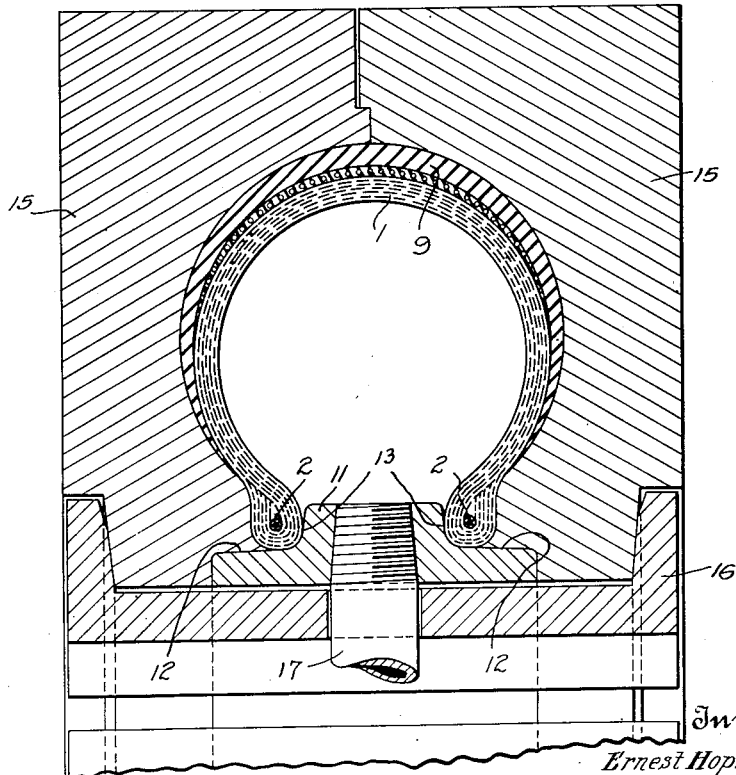
Fig. 7 illustrates the casing with its margins mounted on a sealing-ring confined in a mold in about the position of the parts during vulcanization.

The shaped casing mounted on its sealing ring is then removed from the drum 10. When free, the casing takes the position, approximately, shown in Fig. 6 of the drawings. The shaped casing and sealing ring 11 are then mounted in a sectional mold 15, which is clamped in any suitable way, as indicated at 16. Fluid under any suitable pressure may then be supplied through the valve-stem 17 to the interior of the casing and the tire vulcanized.

No further recapitulation of the steps involved in the process are thought to be necessary in view of the foregoing description. As the invention is presently comprehended, its essence lies in the idea of utilizing vulcanizable rubber composition, applied in any form or manner whatsoever, to the exterior of a carcass which has been half-way, or partly, shaped to final tire form in order to more or less completely retain the half-way, or partly, formed carcass in its transient condition. By this course, the inflating bag 5 or other means employed for half-way forming the casing may be withdrawn so as to leave the interior unobstructed and ready to receive an annular molding device. This may be in the form of, or resembling, the sealing ring 11—desirable when a fluid pressure is to be applied directly to the interior of the casing—or it may be in the form of a fluid-holding bag, usually made of rubber, or fabric, or both, and with relatively thick walls. In the latter case, during vulcanization, fluid admitted to the interior of the bag exerts its pressure through its walls to the inner surface of the casing. The water-, or air-, bag, used as an annular support for the casing during vulcanization, is usually of a size and shape very closely approximating the outline of the tube-receiving cavity in the finished casing and our invention contemplates the use of such a bag during vulcanization.

In small size casings, we prefer to apply the tread of vulcanizable rubber composition 9 with its skirts extending to the beads, as shown in Fig. 3, but for large size casings, where there is a relatively great difference in the diameters of the tread and bead portions of the casing, we prefer to make the tread 9 of a width less than the distance around the carcass from bead to bead. It is to be distinctly understood, therefore, that the vulcanizable rubber composition 9, applied externally to the carcass, may vary in width, if desired, it being essential only that there be enough grasp on the carcass to maintain it partly shaped. When the tread stock 9 terminates short of the beads of the casing, we preferably apply more or less narrow strips of rubber composition to the bead portions while the casing is flat.

It is to be understood that the invention is not limited to the precise procedure set forth and reference is therefore made to the appended claims for an understanding of the scope of the invention.

In the claims by "partially forming" is meant a shaping of the band to a standing height from the line of the beads to the center of the tread of less than three-quarters of the standing height of the finished tire.

Having thus described our invention, what we claim and desire to protect by Letters Patent is:

1. A method of manufacturing tire casings for motor vehicles which consists in, making a substantially flat band of strain-resisting-elements and rubber composition, partially forming the band to tire shape, applying a tread of vulcanizable rubber composition to the band to hold it partly shaped, further forming the band substantially to tire shape and mounting it on an annular support, and finally vulcanizing the casing on the annular support.

2. A method of manufacturing tire casings for motor vehicles which consists in, making a substantially flat band of strain-resisting-elements and rubber composition, partially forming the band to tire shape, applying a tread of vulcanizable rubber composition to the band to hold it partially shaped, completely shaping the band and simultaneously seating its margins on a sealing ring, and finally vulcanizing the casing with fluid under pressure directly in contact with its inner surface.

3. A method of manufacturing tire casings for motor vehicles which consists in, making a substantially flat band of strain-resisting-elements and rubber composition, forming the band approximately semi-circular in cross-section, applying a tread of vulcanizable rubber composition to the band to hold it approximately semi-circular, further forming the band substantially to tire shape and mounting it on an annular support, and finally vulcanizing the casing on the annular support.

4. A method of manufacturing tire casings for motor vehicles which consists in, making a substantially flat band of strain-resisting-elements and rubber composition, forming the band approximately semi-circular in cross-section, applying a tread of vulcanizable rubber composition to the band to hold it approximately semi-circular, completely shaping the band and simultaneously seating its margins on a sealing ring, and finally vulcanizing the casing with fluid under pressure directly in contact with its inner surface.

5. A method of manufacturing tire casings for motor vehicles which consists in, making a substantially flat band of strain-resisting-elements and rubber composition, partially forming the band to readily receive an annular support, applying a tread of vulcanizable rubber composition to the band to substantially maintain it in shape, introducing an annular support within the partly formed band, completely forming the band to tire shape, and finally vulcanizing the casing.

6. A method of manufacturing tire casings for motor vehicles which consists in, making a substantially flat carcass of plies of rubberized cords, partially forming the flat carcass to readily receive between its margins an annular support, applying a tread of vulcanizable rubber composition to the partly shaped carcass to substantially maintain it in this form, mounting the margins of the partly shaped casing on an annular support and simultaneously completing its transformation to tire shape, and finally vulcanizing the casing while subjecting its inner surface to fluid pressure.

7. A method of manufacturing tire casings for motor vehicles which consists in, making a substantially flat carcass of plies of rubberized cords, differentially pressing upon the carcass between its margins so as to form it partly to tire shape and facilitate the introduction therein of an annular support, applying a tread of vulcanizable rubber composition to the partly shaped carcass to substantially maintain it in this form, completely forming the band to tire shape and in vulcanizing position on an annular support, and finally vulcanizing the casing on the annular-support.

8. A method of manufacturing tire casings for motor vehicles which consists in, making a substantially flat carcass of plies of rubberized cords, differentially pressing upon the carcass between its margins so as to form it partly to tire shape and facilitate the introduction therein of an annular ring, applying a tread of vulcanizable rubber composition to the partly shaped carcass to substantially maintain it in this form, mounting the margins of the partly shaped casing on the annular ring and simultaneously completing its transformation to tire shape, and finally vulcanizing the casing while applying fluid pressure to its inner surface.

9. A method of manufacturing tire casings for motor vehicles which consists in, making a substantially flat carcass of plies of rubberized cords, forming the carcass approximately semi-circular with an inflatable tube, applying a tread of vulcanizable rubber composition to the semi-circular carcass to substantially maintain it in this form, pressing with mechanical devices upon the sides of the partly shaped carcass to completely form it to tire shape and simultaneously mounting it on an annular support, and finally vulcanizing the casing between rigid mold sections while subjecting it internally to fluid pressure.

Signed at New York city, county of New York, and State of New York, this 14th day of November, 1922.

ERNEST HOPKINSON.

Signed at New York city, county of New York, and State of New York, this 14th day of November, 1922.

WILLIAM J. STEINLE.